United States Patent
Tng et al.

(10) Patent No.: US 6,904,062 B1
(45) Date of Patent: Jun. 7, 2005

(54) METHOD AND APPARATUS FOR EFFICIENT AND FLEXIBLE ROUTING BETWEEN MULTIPLE HIGH BIT-WIDTH ENDPOINTS

(75) Inventors: Seng-Khoon Tng, Sunnyvale, CA (US); Jungtai Jason Lin, San Jose, CA (US)

(73) Assignee: Waytech Investment Co. Ltd. (VG)

( * ) Notice: Subject to any disclaimer, the term of this patent is extended or adjusted under 35 U.S.C. 154(b) by 0 days.

(21) Appl. No.: 09/298,751

(22) Filed: Apr. 23, 1999

(51) Int. Cl.[7] .................................................. H04J 3/02
(52) U.S. Cl. ........................ 370/537; 370/303; 370/380; 370/386
(58) Field of Search .......................... 370/303, 357–366, 370/368, 369, 380, 386, 537, 356; 709/200, 210

(56) References Cited

U.S. PATENT DOCUMENTS

| | | | | |
|---|---|---|---|---|
| 4,512,018 A | * | 4/1985 | Phelps et al. ................ | 370/539 |
| 4,528,664 A | * | 7/1985 | Cheng et al. ................ | 370/526 |
| 4,665,538 A | * | 5/1987 | Machida ....................... | 377/69 |
| 4,786,893 A | * | 11/1988 | Moore ........................ | 345/600 |
| 4,833,673 A | * | 5/1989 | Chao et al. .................. | 370/537 |
| 4,914,655 A | * | 4/1990 | Johannes et al. ............ | 370/540 |
| 5,555,202 A | * | 9/1996 | Chu ............................ | 708/209 |
| 5,892,604 A | * | 4/1999 | Yamanaka et al. .......... | 370/395.1 |
| 6,128,317 A | * | 10/2000 | Mackre ....................... | 370/466 |
| 6,172,626 B1 | * | 1/2001 | McDonnell et al. ......... | 370/465 |
| 6,205,522 B1 | * | 3/2001 | Hudson et al. .............. | 709/200 |
| 6,215,429 B1 | * | 4/2001 | Fischer et al. .............. | 341/139 |
| 6,269,103 B1 | * | 7/2001 | Laturell ....................... | 370/376 |
| 6,308,189 B1 | * | 10/2001 | Nguyen ....................... | 708/209 |
| 6,347,344 B1 | * | 2/2002 | Baker et al. ................. | 710/20 |

OTHER PUBLICATIONS

"Design of a 4–Bit Barrel Shifter," CIS 273: Computer Organization & Design, Laboratory #10; available at <http://www.cis.umassd.edu/~amathuria/273/lab10/s02–273–lab10.html>, Spring 2002, University of Massachusetts Dartmouth.

I $^2$S Bus Specification Philips Semiconductors (Rev. Jun. 5, 1996).

Audio Codec '97 Specification Intel Corp. (Rev. 2.1, May 22, 1998).

* cited by examiner

*Primary Examiner*—Hassan Kizou
*Assistant Examiner*—David Odland
(74) *Attorney, Agent, or Firm*—Carr & Ferrell LLP

(57) ABSTRACT

Multi-bit data signals are digitally switched between input and output endpoints for simultaneously interconnecting various sets of inputs and output endpoints. Single input may send data to single endpoint, or single input may send data to multiple output endpoints. Multiple bitwidth (b) data is serialized to single bitwidth at high data rate using N-by-1 multiplexer. Loadable barrel shifters shift serial data, so same data is used by multiple output endpoints at different times.

14 Claims, 4 Drawing Sheets

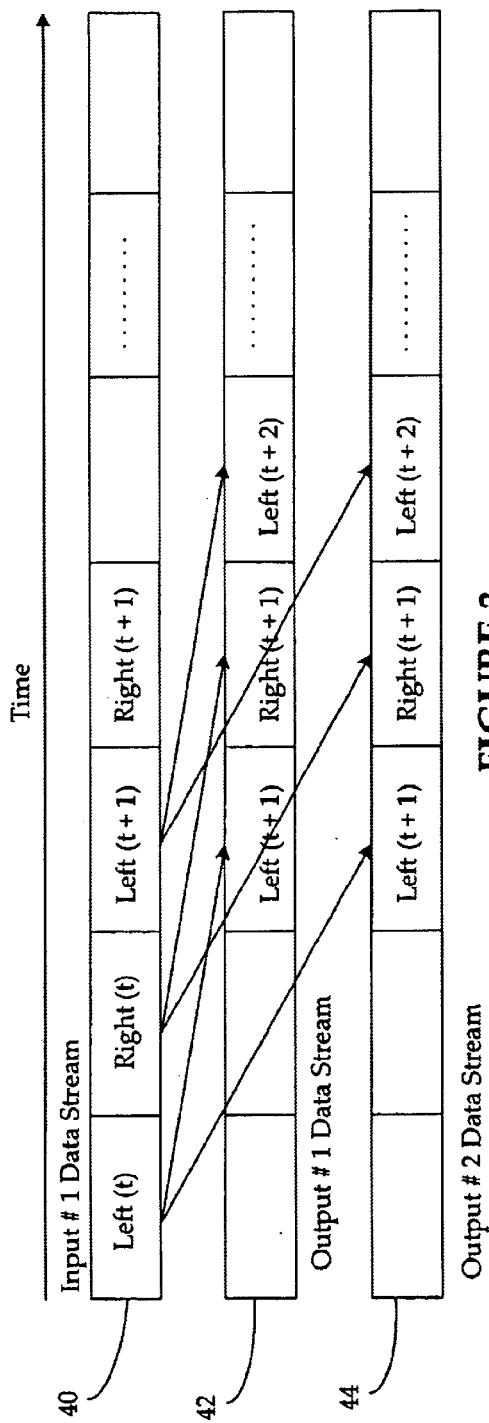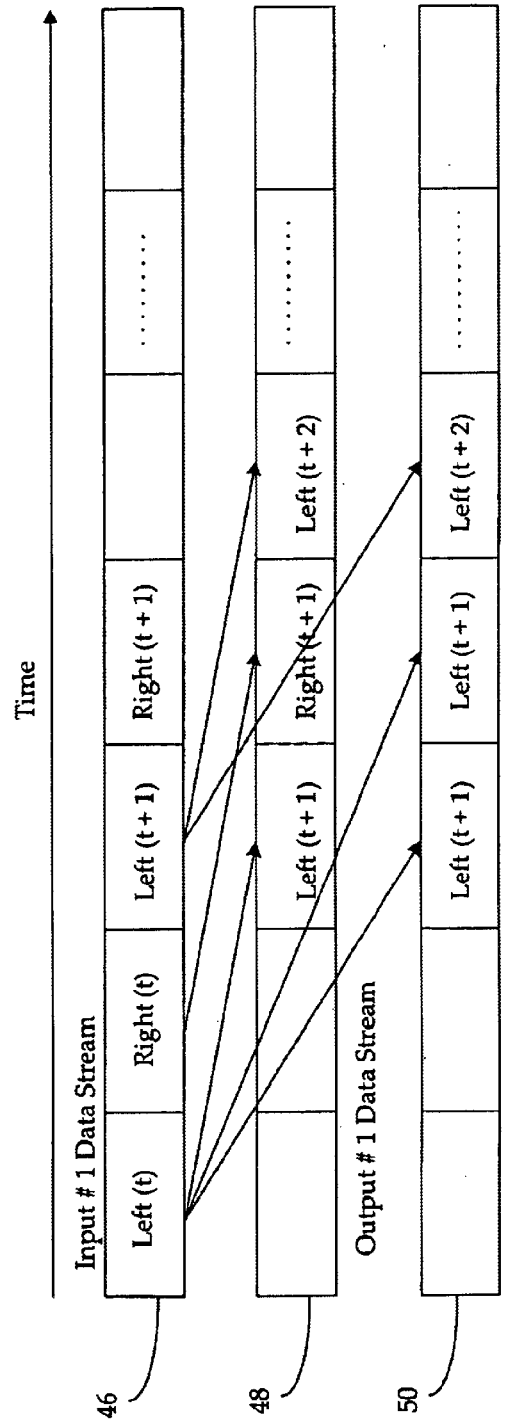

METHOD AND APPARATUS FOR EFFICIENT AND FLEXIBLE ROUTING BETWEEN MULTIPLE HIGH BIT-WIDTH ENDPOINTS

FIELD OF INVENTION

Invention relates to digital signal switching and routing, particularly to flexible interconnection between multiple high bit-width endpoints.

BACKGROUND OF INVENTION

Conventional electronic systems, such as personal computers (PCs), provide signal interconnections between various functional components or other system modules, such as peripherals, storage, interfaces, or media devices. For example, so-called multi-media PC and other related electronic hardware may provide multiple inputs and outputs for digital audio data signal connections, whereby data signals are sent from certain input(s) to certain output(s).

In some implementations, digital signal switching is accomplished using hardware-based multiplexers, shared bus, or digital controller approach. Multiplexer approach, however, typically requires relatively large number of gates or transistors, especially when switching many endpoints, whereupon multiplexer size may grow linearly relatively to number of switched signal lines. Moreover, shared bus approach faces challenge of sending data simultaneously between multiple endpoint groups, since shared bus typically restricts bus access to single group at a time.

Furthermore, regarding digital controller approach to digital signal switching, hardware switching is typically achieved using relatively large temporary storage and so-called FIFO buffers at each input and output. In this way, digital controller effectively time-shares each channel and move data from one input FIFO to another output FIFO. Such approach is undesirable, however, because FIFO buffers and digital controller require many gates to implement. Thus, there is a need for improved digital signal switching solution, particularly to provide flexible interconnection between multiple high bit-width endpoints.

SUMMARY OF INVENTION

Invention resides in apparatus and/or method for switching or routing digital signals flexibly through interconnection between multiple high bit-width endpoints. Multi-bit data signals are digitally switched between input and output endpoints for simultaneously interconnecting various sets of inputs and output endpoints. Single input may send data to single endpoint, or single input may send data to multiple output endpoints. Multiple bitwidth data is serialized to single bitwidth at high data rate using N-by-1 multiplexer. Loadable barrel shifters shift serial data, so same data is used by multiple output endpoints at different times.

BRIEF DESCRIPTION OF DRAWINGS

FIGS. 3–5 are timing diagrams illustrating operational aspects of present invention.

DETAILED DESCRIPTION OF PREFERRED EMBODIMENT

Figure 1:
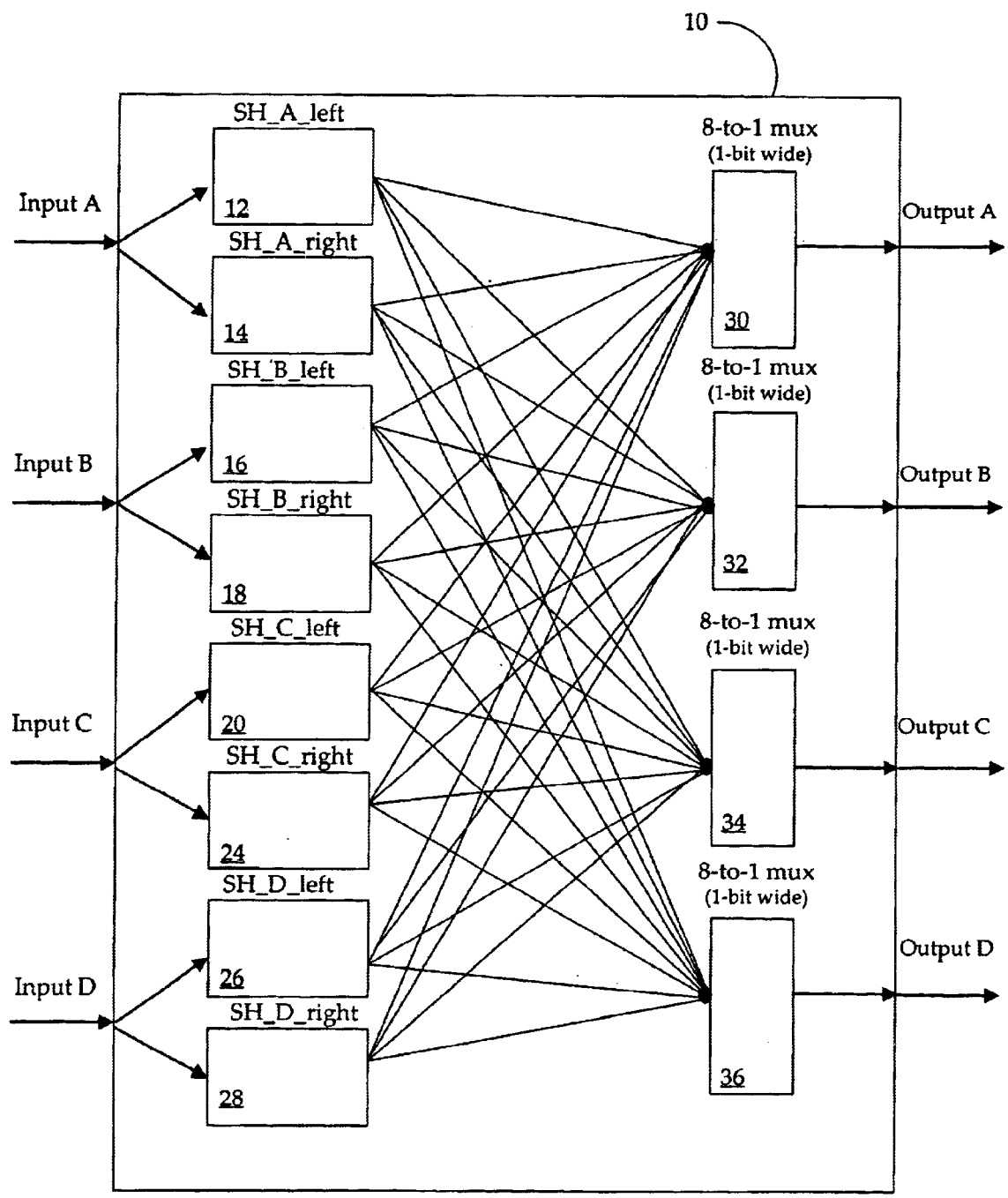
FIGS. 1 and 2A–C are block diagrams of interconnect logic for implementing the present invention.

Preferred embodiment is implemented in circuit and/or operation thereof for selectably interconnecting electrical signals for transmission between specified endpoints. Hence, multi-bit data signals are digitally switched, routed, or otherwise electronically communicated between one or more input and output endpoints, thereby simultaneously interconnecting various sets of inputs and output endpoints.

For example, present signal communication and processing implementation operates such that single input may be caused programmably to send data signal to certain single endpoint, or such single input is caused to transmit data signal to multiple output endpoints. Furthermore, multiple bitwidth data is serialized in present embodiment to single bitwidth at high data rate using N-by-1 multiplexer, as described herein. In addition, loadable barrel shifters are provided for shifting serial data, such that same data signal is used by multiple output endpoints, preferably at different times.

Generally, in accordance with one aspect of the present invention, incoming data signal may be received in substantially serial form, however, such serialized data signal may be provided effectively with one or more components or channels of data or other representative signal information interleaved or otherwise encoded therein. Such serialized data signal may be convert into corresponding parallel-format signals, which represent such serial signal components or channelized data, preferably by using registers that latch parallel data, thereby using copies thereof for multiplexing operation to route received data signal.

Moreover, alternatively, incoming data signal may be received by present implementation in substantially parallel form, whereupon received parallel data signal may be converted substantially to serial form, preferably for signal communication and processing of high bitwidth data. Additionally, signal communication and processing may be performed upon received signal in serial form, preferably by using multiple copies of multiplexed signal.

As described further herein, barrel shifter or equivalent circuit functionality is provided in present implementation for interconnecting, switching, routing, or otherwise electrically coupling specified input data signal(s) to specified output data signal(s), or representative slots, ports, pins, locations, lines, or other electrically identifiable node, preferably at different times or clock cycles or periods.

Preferably, present implementation is provided on integrated circuit semiconductor chip wherein same set of input and/or output physical pins or endpoints are accessible for interconnection to one or more interface or protocol circuit, such as so-called AC97 or I2S coder/decoder (codec) functionality. Accordingly, present implementation serves generally as hardware block for controlling such serial interface or protocol, thereby enabling in- and/or out-bound serial data to be processed and switched in accordance with applicable codec configuration, signal interface, or other interface functional requirement. Hence, present implementation effectively avoids the need to use multiple sets of physical pins on-chip for such switch interface purpose.

In the case of media signal processing application, such as multi-track audio recording and playback equipment, interconnect or switching devices may be provided to enable flexible signal routing between multiple inputs and outputs connectors, thereby reducing device cost to implement flexible routing. Preferably, present interconnect scheme flexibly routes audio data, such as in so-called PCM format. Additionally, present interconnect scheme may serve similarly to process other high bit-width digital data streams between multiple input and output endpoints.

Optionally, multiple sets of input and output signals and corresponding endpoints may be selectively interconnected using present scheme to enable simultaneous signal communication, whereby each input and/or output endpoints are interconnected to transmit multiple bit-width data signals (e.g., for 32 bit-wide endpoints).

Generally, present interconnect scheme supports signal coupling to N-number of endpoints, such that each endpoint may send digital data signals to another endpoint. Correspondingly, each endpoint may receive digital data signals from any other endpoints at any time. Preferably, data signal bitwidth of endpoints is larger than one bit.

FIG. 1 block diagram shows an example of implementing present interconnect scheme for 4-way stereo input/output routing block 10, which couples to 4 serialized inputs Onputs A–D) and 4 serialized outputs (Outputs A–D). Each serialized input is implemented into 2 distinct channels, and data are interleaved within the input signals. Inputs are connected to two loadable barrel shifter modules (i.e., Input A is coupled to barrel shifters SH_A_left 12 and SH_A_right 14; Input B is coupled to barrel shifters SH_B_left 16 and SH_B_right 18; Input C is coupled to barrel shifters SH_C_left 20 and SH_C_right 24; and Input D is coupled to barrel shifters SH_D_left 26 and SH_D_right 28.)

In this interleaved manner, preferably for each input signal, left channel data is loaded into the first ("left") barrel shifter module, and right channel data is loaded into the second ("right") barrel shifter. Moreover, incoming serial data format can be either so-called I2S or AC97 convention. Optionally, input data may be received in parallel form (i.e., not serialized), such that data is serialized prior to first before being received by routing block 10.

Output signals generated from each loadable barrel shifter module 12, 14, 16, 18, 20, 24, 26, 28 may be selectively interconnected to a set of M-to-1 1-bit-wide multiplexers 30, 32, 34, 36, where M represents total number of loadable barrel shifter modules. Multiplexers 30, 32, 34, 36 respectively generate Output signals A–D. Hence, any input channel may be routed electrically for signal transmission to any output channel, thereby minimizing gate usage. Note that number of input pins does not have to be same as number of output pins.

Figure 2A:
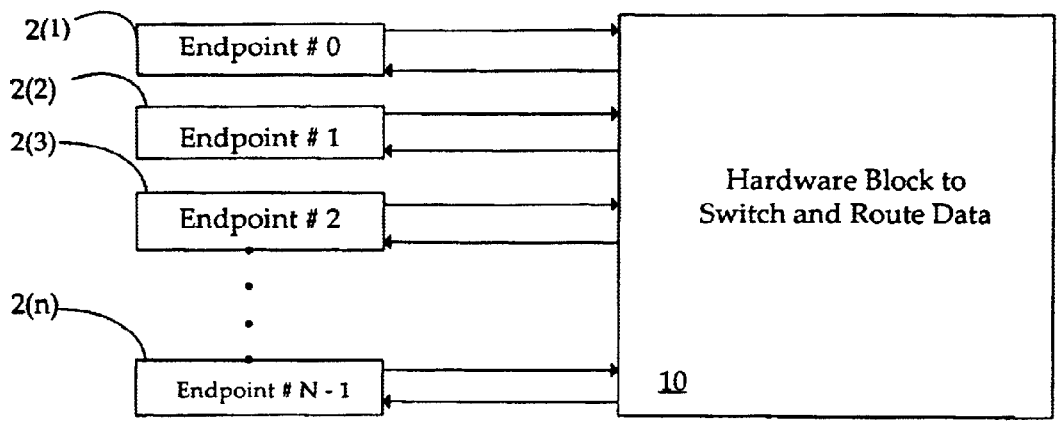
Figure 2B:
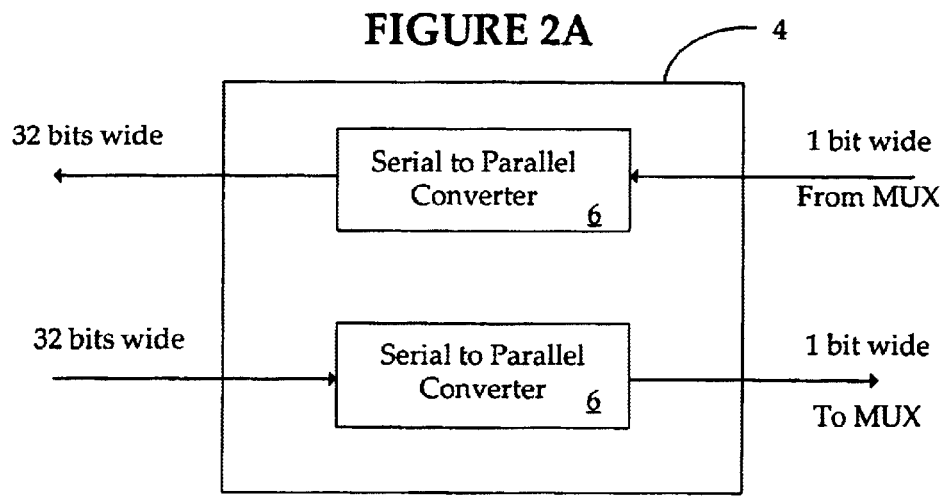

FIG. 2A shows general implementation of present interconnect scheme, whereupon various endpoints 2(1), 2(2), . . . , 2(N) are flexibly switched and/or routed through hardware block 10. Preferable, at least one improved endpoint is provided with serial to parallel converter circuit 6 or parallel to serial converter circuit 7, which each convert a multi-bitwidth (e.g., 32-bits) signal for sending to or receiving from one or more 1-bit wide signals generated by or transmitted by multiplexers in block 10.

When operating, present interconnect scheme may send data signal from one input endpoint to multiple output endpoints instead of one-to-one. Because output endpoints may need data from particular input endpoint at specified or different time, input data signal bits are serialized and saved effectively. To achieve such saving or storage approach, multiple sets of shift registers may be used for each input data, wherein each shift register shifts at different times, depending on when corresponding output point needs data. However, multiple shift registers require many gates.

Figure 2C:
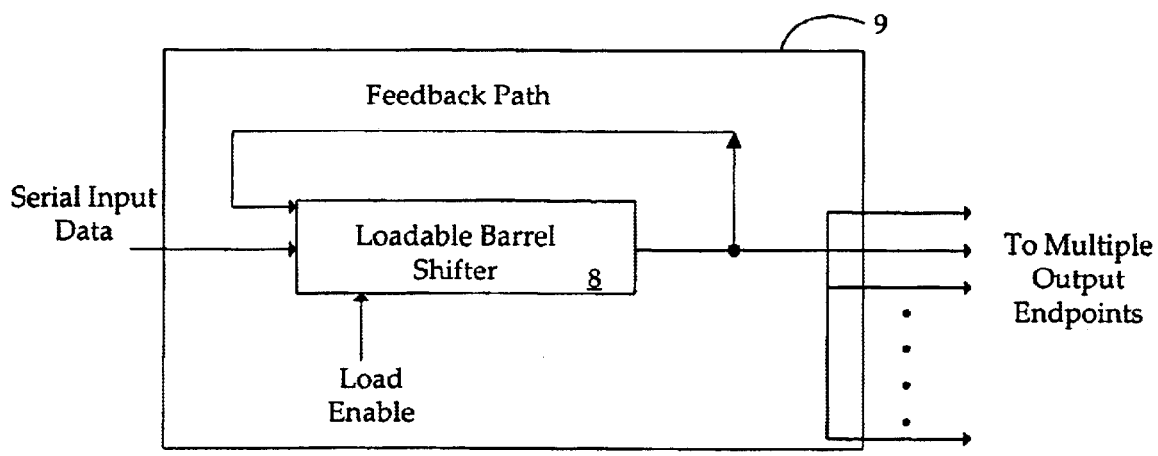

Hence, preferred interconnect scheme uses a set of loadable barrel shifter modules for each input endpoint. As shown in FIG. 2c, loadable barrel shifter module 9 is provide such that serial input data is loaded into loadable barrel shifter 8 upon load enable signal being applied thereto. Specified single or multiple output multiplexers or endpoint(s) receive data signal at any time, independent of other output endpoints.

Preferably, loadable barrel shifter module 9 includes single barrel shifter 8, wherein shifter size equals bit-width of data format. For example, 24-bit data used for audio signal processing application uses 24-bit barrel shifters. Barrel shifter is preferable over non-barrel shifters, such that current data may be stored temporarily for use in next time slot. Hence, in subsequent time slot, stored data may be reused for sending to another channel or endpoint.

Figure 5:
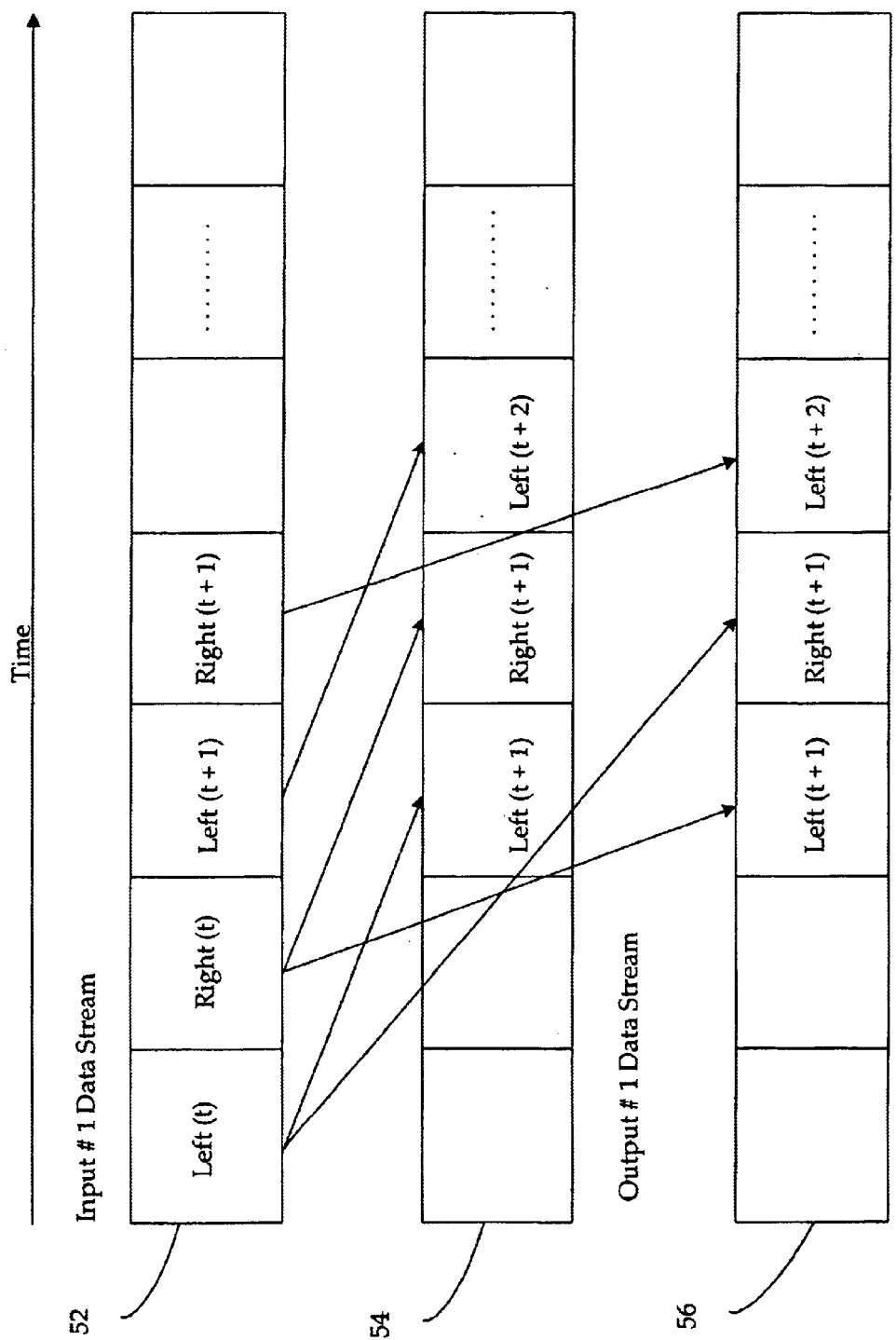

To illustrate present interconnect scheme, FIGS. 3–5 show timing cycles for routing and/or switching data signals from stereo input to various multiple channels or outputs. Generally, after received data signal is shifted to left output channel, such data is routed back to applicable barrel shifter so that different channel may use the stored data. In comparison, if shift registers are used, data is lost effectively after being shifted, and, thus, 2 sets of shift registers are required for each input channel in order to route subject data signal to either left or right output channels. Accordingly, with barrel shifter approach, each channel only needs one set of shifter, instead of two registers to hold same data.

FIG. 3 shows left and right interleaved components of Input #1 data stream timing 40 relative to Output #1 data stream 42, and Output #2 data stream 44. Here, stereo input signal is interconnected to 2 stereo outputs simultaneously. FIG. 4 shows left and right interleaved components of Input #1 data stream timing 46 relative to Output #1 data stream 48, and Output #2 data stream 50, whereupon Output #2 is provided as left-repeated data stream. FIG. 5 shows left and right interleaved components of Input #1 data stream timing 52 relative to Output #1 data stream 54, and Output #2 data stream 56, whereupon Output #2 is provided as stereo-reversed output data stream.

Foregoing described embodiments of the invention are provided as illustrations and descriptions. They are not intended to limit the invention to precise form described. In particular, Applicants contemplate that functional implementation of invention described herein may be implemented equivalently in hardware, software, firmware, and/or other available functional components or building blocks. Other variations and embodiments are possible in light of above teachings, and it is thus intended that the scope of invention not be limited by this Detailed Description, but rather by Claims following.

What is claimed is:

1. An electronic switching apparatus for flexibly interconnecting a plurality of signal endpoints, the apparatus comprising:

a first circuit configured to receive at least one input signal from at least one input endpoint, the first circuit having at least one pair of barrel shift registers coupled to at least one of the at least one input endpoint and configured to receive the at least one input signal, the first circuit further configured to shift and rotate the at least one input signal and further configured to transmit at least one output signal; and a second circuit configured to send at least one received signal to at least one output endpoint and comprising at least one multiplexer directly coupled to at least one of the barrel shift registers.

2. The electronic switching apparatus of claim 1, wherein the at least one input signal comprises a data signal that is configured to be received in serial form, the data signal including a plurality of data channels interleaved therein.

3. The electronic switching apparatus of claim 2, wherein the at least one multiplexer is configured to be selectably connected to the at least one pair of barrel shift registers thereby effectively enabling digital signal switching simultaneously between the at least one input endpoint and the at least one output endpoint.

4. The electronic switching apparatus of claim 1, wherein the at least one input signal comprises a data signal that is configured to be received in parallel form and converted to serial form.

5. The electronic switching apparatus of claim 2, wherein the at least one pair of barrel shift registers is configured to interconnect a plurality of received input signals at different times.

6. The electronic switching apparatus of claim 1, wherein the at least one input endpoint or the at least one output endpoint corresponds to at least one pin for a coder/decoder (codec) device, such codec device being compliant with an AC97 or an I2S convention.

7. A method for electronic signal coupling, the method comprising the steps of:

receiving a first set of digital signals, the received first set of digital signals being provided to at least one pair of barrel shift registers;

shifting and rotating the first set of digital signals; and transmitting a second set of digital signals, the transmitted second set of digital signals being provided from a plurality of multiplexers, wherein at least one of the plurality of multiplexers is directly connected to at least one of the barrel shift registers such that at least one signal selected in the first set of digital signals is selectably coupled for transmission in the second set of digital signals.

8. The method of claim 7, wherein the first set of digital signals comprises a data signal which is received in either serial or parallel form, the data signal being converted to serial form when received in parallel form.

9. The method of claim 7, wherein a plurality of digital signals in the first set of digital signals is transmitted as digital signals in the second set of digital signals separately at different times.

10. The method of claim 7, wherein at least one transmitted digital signal from the second set of digital signals is coupled to at least one pin associated with a coder/decoder (codec) according to an AC97 or I2S signal interface.

11. The method of claim 7, wherein the step of transmitting further comprises transmitting the at least one output signal to at least one multiplexer at different times.

12. The electronic switching apparatus of claim 1, wherein the at least one pair of barrel shift registers are loadable barrel shift registers.

13. The electronic switching apparatus of claim 1, further comprising a plurality of multiplexer modules.

14. A system for electronic signal coupling comprising:

means for receiving a first set of digital signals, the received first set of digital signals being provided to at least one pair of barrel shift registers;

means for shifting and rotating the first set of digital signals; and means for transmitting a second set of digital signals, the transmitted second set of digital signals being provided from a plurality of multiplexers, wherein at least one of the plurality of multiplexers is directly connected to at least one of the barrel shift registers such that at least one signal selected in the first set of digital signals is selectably coupled for transmission in the second set of digital signals.

* * * * *